March 29, 1949.  L. REICHE  2,465,481
VECTOR CALCULATING DEVICE
Filed Jan. 23, 1945  3 Sheets-Sheet 1
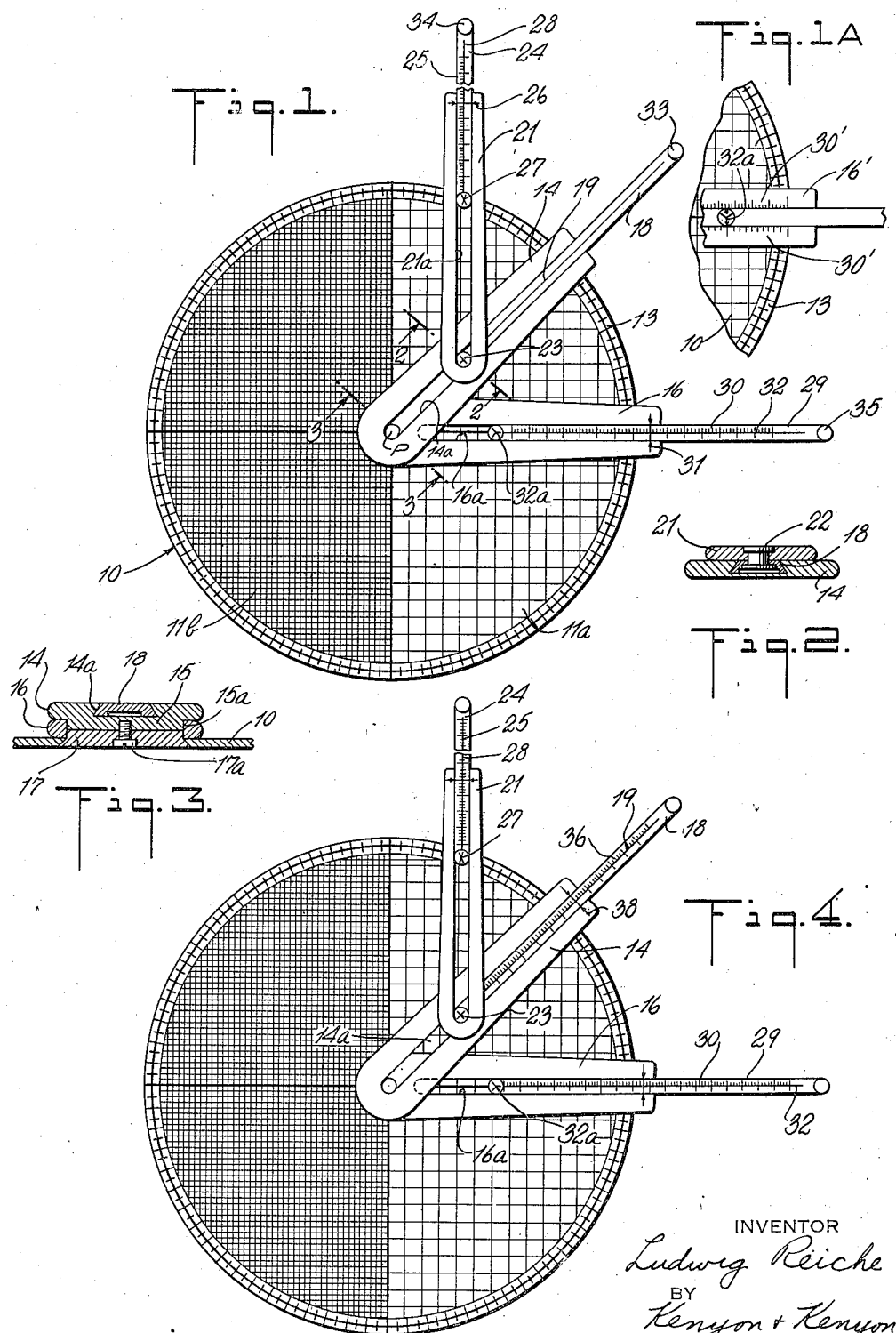
INVENTOR
Ludwig Reiche
BY
Kenyon & Kenyon
ATTORNEYS March 29, 1949. L. REICHE 2,465,481

VECTOR CALCULATING DEVICE

Filed Jan. 23, 1945 3 Sheets-Sheet 2

INVENTOR
Ludwig Reiche
BY
Kenyon & Kenyon
ATTORNEYS

March 29, 1949. L. REICHE 2,465,481
VECTOR CALCULATING DEVICE
Filed Jan. 23, 1945 3 Sheets-Sheet 3
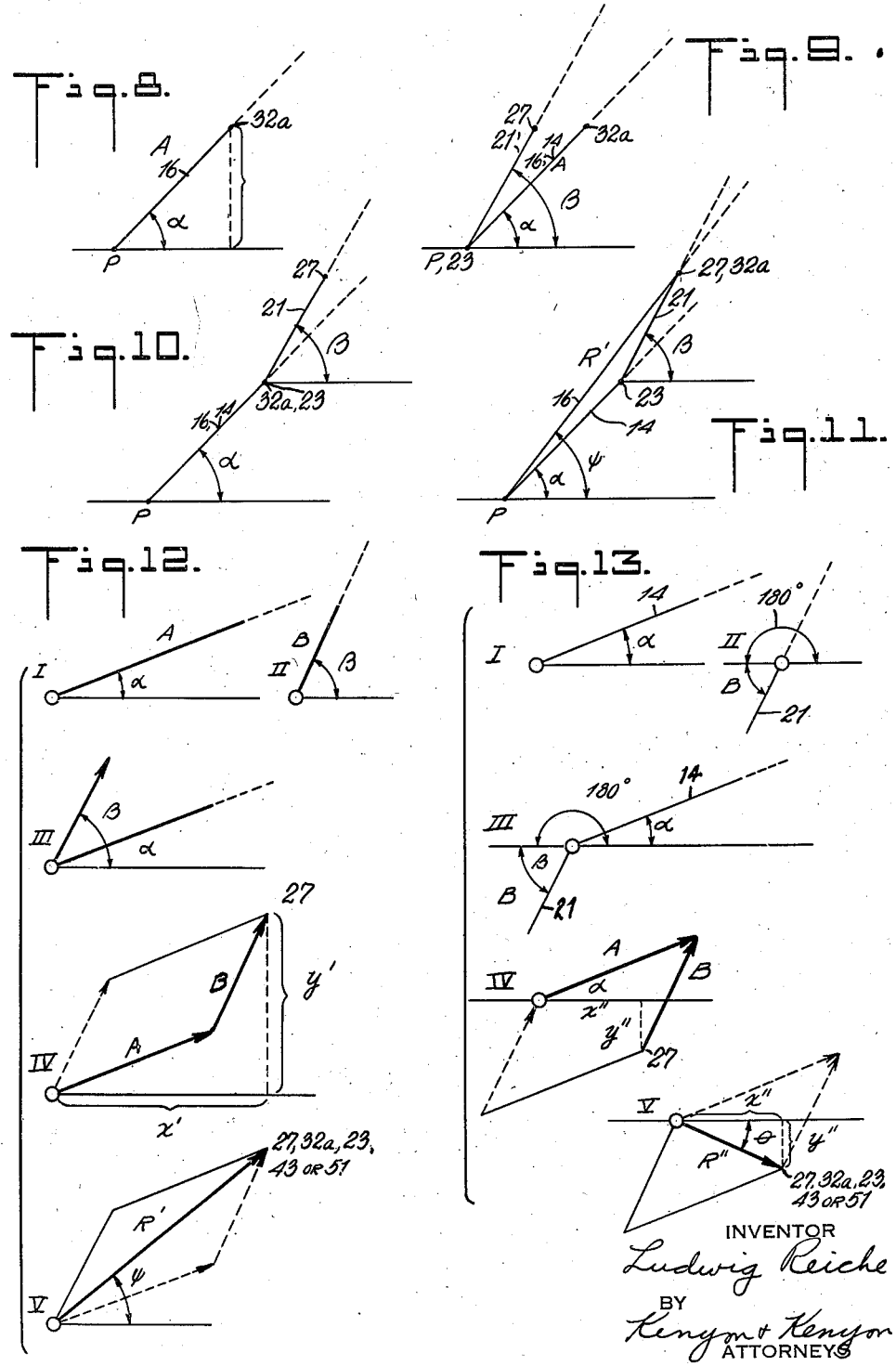

Patented Mar. 29, 1949

2,465,481

UNITED STATES PATENT OFFICE 2,465,481

VECTOR CALCULATING DEVICE

Ludwig Reiche, New York, N. Y.

Application January 23, 1945, Serial No. 574,077

5 Claims. (Cl. 33—76)

This invention relates to calculating devices and more particularly to apparatus for the solution of vector problems.

Vectors are used in mechanics and electricity to denote forces, alternating currents and voltages and the like. The addition and subtraction of vectors for the determination of resultants is, in general, a tedious mathematical process. A principal object of this invention is to provide simple mechanical means for effecting rapid solutions of vector problems.

In effect the devices embodying the invention may be called vector slide rules whose use enables the operator to determine rapidly and accurately the solutions of vector problems involving the addition and/or subtraction of two or more coplanar vectors.

Another object of the invention is to provide devices on which data may be set up and solutions may be read off directly in either the polar or the Cartesian form.

Still further objects of the invention are to provide such devices with a minimum of working parts, that may be simply made at comparatively low cost, that may be easily and quickly operated and that will give accurate solutions for vector problems.

To the accomplishment of the foregoing and such other objects as may hereinafter appear, the invention consists in the novel construction and arrangement of parts hereinafter to be described and then sought to be defined in the appended claims, reference being had to the accompanying drawings forming a part hereof which show merely for the purposes of illustrative disclosure preferred embodiments of the device, it being expressly understood, however, that changes may be made in practice, within the scope of the claims, wthout digressing from the inventive idea.

In the drawing in which similar reference characters denote corresponding parts:

Fig. 1 is a plan view of a device embodying the invention;

Fig. 1(a) shows a modification of details of the device;

Fig. 2 is a section taken along line 2—2 of the device of Fig. 1 and viewed in the direction of the arrows;

Fig. 3 is a section taken along line 3—3 of the device of Fig. 1 and viewed in the direction of the arrows;

Fig. 4 is a plan view of a slightly modified form of device embodying the invention;

Figs. 8, 9, 10 and 11 illustrate diagrammatically the successive positions of various of the members of the device of Fig. 1 in performing a vector addition; and Figs. 12 and 13 illustrate diagrammatically fundamental principles of operations regarding the calculating devices of this invention.

Figure 5:
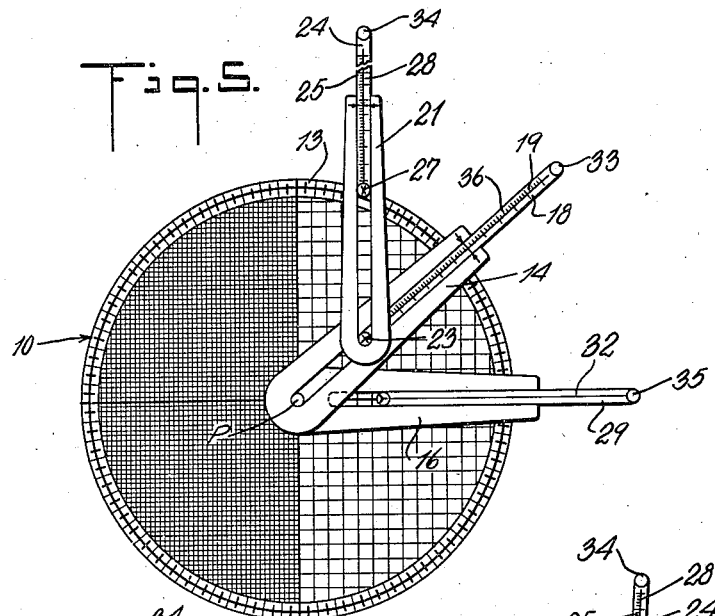
Fig. 5 is a plan view of a further modification.

Referring to the drawing, and first to Fig. 1, 10 denotes a base member of suitable material for example of Celluloid or other plastic. If desired, this base member can be opaque and provided with a mirror surface for a purpose to be presently described. This base member 10 is provided with two or more Cartesian coordinate grid systems 11a and 11b either etched, printed or otherwise applied upon its top face, and a protractor scale 13 extending through 360° similarly applied and having the intersection P of one pair of the horizontal and vertical Cartesian coordinates as its center of generation. The lines of the Cartesian coordinates may be laid out at any suitable spacing. In practice, scales of the grid systems 11a and 11b in the ratio of approximately 3:1 will be found necessary to perform calculations with reasonably large lengths on the base 10 and on the movable members (presently to be described) to obtain accurate results. For example, the lines of system 11b may be spaced tenths or five hundredths of an inch apart, those on scale 11a three times as far apart, and those on the protractor scale 13 may be divided into degrees and/or suitable fractions thereof.

An arm member 14 of suitable transparent material, for example, Celluloid or other plastic, is provided. This arm member has a pivot flange 15 that extends into a circular hole 15a in a second arm member 16. The second arm member 16 is secured pivotally to the base 10 by a plug member 17 extending into hole 15a and is secured to flange 15 by an adjustable screw 17a so that the center of rotation of arm 16 and that of arm member 14 are the point P. They are rotatable independently about the said point P parallel to the top plane of the base 10. The screw 17a may be tightened to provide sufficient friction to maintain the arms 14 and 16 in any adjusted position. Other suitable jointing may be provided.

The arm 14 is provided with a longitudinally extending slot 14a. As shown, this slot has dovetail section to receive a slide member 18 of similar material to member 14 slidably therein so that this slide member 18 may be moved longitudinally along arm 14 in said slot 14a. The member 14 may be deformed to permit insertion of slide 18 and to provide sufficient friction to maintain the slide member 18 in any adjusted position. A center line 19 is suitably applied to the under face of the slide member 18 so that the protractor scale 13 may be read thereby.

A pivoted member 21 of similar material as the other pivoted members 14 and 16 is pivotally secured by a suitable pivot 22 to the inner end of slide member 18 with sufficient friction to maintain any adjusted position and so that its center of rotation 23 may by movement of slide 18 be positioned in axial alignment with the center P. This center of rotation 23 is suitably applied as a reference mark. The member 21 has a longitudinally extending slot 21a similar in section to slot 14a and a slide member 24 is mounted and carried in this slot in similar manner to that in which the other slide member 18 is carried in its arm 14. This slide member 24 has two or more linear scales 25 suitably applied to its under side and designed to cooperate with cross line 26 applied to the lower surface of member 21. The inner end of slide member 24 also has a reference mark 27. The slide member 24 has a center line 28 along the entire length of its lower surface to be used in reading the protractor scale 13.

The pivoted arm member 16 is of material similar to member 14 and is independently rotatable about center P as described above. A longitudinally extending slot 16a is provided in member 16. This slot 16a has a dovetail section similar to that of slot 14a and a slide member 29 of material similar to arm 14 is slidably carried by the slot 16a so that said slide member 29 may be moved longitudinally along arm 16 in said slot 16a. Sufficient friction is provided to maintain the slide in any adjusted position. The slot 16a at its inner end terminates short of the hole 15a. Linear scales 30 are suitably applied to the under surface of slide member 29. Cross line 31 is applied to the lower surface of arm 16 adjacent its outer end so that the slide member 29 may be adjusted to any desired position with respect to the cross line 31. The slide 29 likewise has a center line 32 along the entire length of its lower surface so that the protractor scale 13 can be read therewith. It likewise has a reference mark 32a at its inner end.

The arm members 14, 16 and 21 may have rounded edges to prevent sticking when moved relative to each other.

The three slide members 18, 24 and 29 are provided at their outer ends with suitable manipulating knobs 33, 34 and 35.

Structurally the modification of Fig. 4 is identical with that of Figs. 1 to 3 and identical reference characters denote corresponding parts. The additional feature in this structure is the provision on the under face of slide 18 of linear scales 36. Likewise the cross line 38 is applied to the lower surface of member 14 on which scales 36 may be read.

Likewise, structurally, the modification of Fig. 5 is identical with that of Figs. 1 and 4 and identical reference characters denote corresponding parts. The difference in this modification over that of Fig. 4 is the elimination of the scales 30, as well as the cross line 31.

Figures 6, 7:
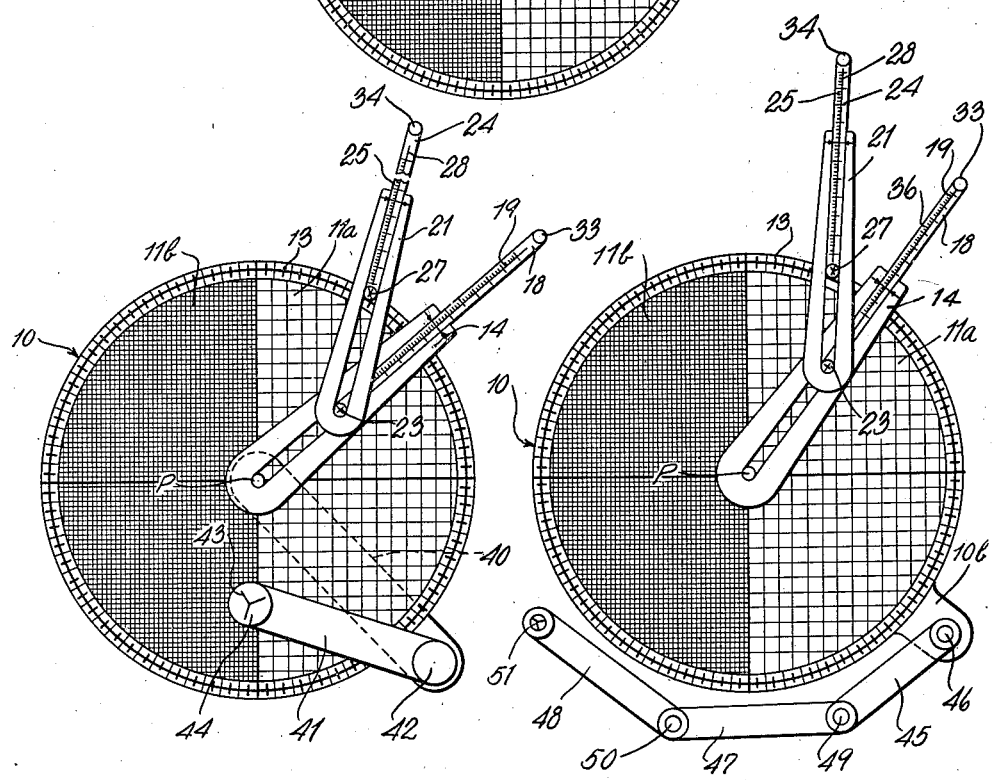
Fig. 6 is a plan view of still another modification.
Fig. 7 is a plan view of yet another modification.

The modification of Fig. 6 resembles that of Fig. 5 except that the member 16 and slide member 29 are eliminated. Corresponding reference characters denote identical parts. In place of the eliminated members 16 and 29, an arm member 40 is pivotally secured to the under face of the base 10 so that its center of rotation is the point P. This arm member 40 extends outwardly beyond the periphery of the base member 10. Another arm member 41 is pivotally secured at 42 to the arm member 40 so as to be movable over the top face of base member 10. This arm 41 has a suitable reference mark 43 applied to its under face for a purpose to be presently described. Arm members 40 and 41 are secured at their joining points with friction joints so that they will retain any adjusted position. Likewise these members are preferably of transparent material similar to that of the other members 14, 21, 18 and 24.

The further modification of Fig. 7 resembles that of Fig. 6 except that the arms 40 and 41 are eliminated. Corresponding reference characters denote identical parts. In place of arms 40 and 41, the peripherally located flange 10b is provided on the base 10. A link member 45 is pivotally secured at 46 to the flange 10b. Additional link members 47 and 48 are provided, link member 47 being pivotally secured at 49 to link member 45, and link member 48 being pivotally secured at 50 to the link member 47. The link members 45, 47 and 48 are preferably of transparent material similar to that of the other members 14, 21, 18 and 24. A suitable reference mark 51 is applied to the under face of link member 48 for a purpose presently to be described. The pivot joints 46, 49 and 50 are made sufficiently tight frictionally to maintain the links 45, 47 and 48 in any adjusted position.

The modifications of Figs. 6 and 7 are advantageous in that they have greater mechanical stability, less parallax effects and are simpler to construct.

The devices of Figs. 4–7 inclusive all may be used in identical ways to transform a given vector from polar coordinate form to Cartesian form and vice versa. For such operations only the base 10, arm member 14 and slide 18 of each thereof need be used.

For example, given the vector $A \angle \alpha$ of Fig. 8, to obtain the corresponding Cartesian coordinates of such a vector, the vector $A \angle \alpha$ is set up by first rotating the arm 14 about center P until the center line 19 indicates the angle $\angle \alpha$ on protractor scale 13. Thereafter the slide 18 is pulled out in its slot 14a until the cross line 38 on member 14 indicates on the scales 36, the magnitude $|A|$. This positions the reference 23 with respect to the base 10 at a position corresponding to $x+jy$. The values of $x$ and $y$ are then read directly on the scale 11a or 11b giving the solution of the transformation of polar form $A \angle \alpha$ to Cartesian form $x+jy$.

Conversely, if the Cartesian form $x+jy$ is given, the polar form $A \angle \alpha$ is readily formed by manipulating the arm 14 about its pivot and the slide member 18 to position the reference 23 at a point on scale 11a or 11b of base 10 corresponding to $x+jy$. The polar transformation is then read directly, $|A|$ being the value on scales 36 under cross line 38 and $\angle \alpha$ being the value on protractor scale 13 under center line 19.

The same results may be achieved in the device of Fig. 1 by manipulating the arm 16 and slide member 29 in a manner corresponding to that described for arm 14 and slide member 18 of Figs. 4–7 inclusive. This arm 16 must be used in Fig. 1 instead of arm 14 because there are no scales on the slide 18 of Fig. 1.

To perform a vector addition or subtraction of two vectors $A\angle\alpha$ and $B\angle\beta$ with the devices of Figs. 4–7 inclusive, with reference to Fig. 12, the slide member 18 of these figures is pushed in slot 14a to position reference 23 over the center P, and (I) arm 14 is rotated about center P until the angle $\alpha$ is read on protractor scale 13 under center line 19. (II) Then arm 21 is rotated about P as a center until the angle $\angle\beta$ is read on protractor scale 13 under center line 26. (III) Maintaining this angular position of arm 21, the slide 24 is pulled out until the magnitude |B| is read on scales 25 under cross line 26. (IV) Then still maintaining the angular position of arm 21, the slide 18 of arm 14 is pulled out along slot 14a until the magnitude |A| appears on scales 36 under cross line 38. This positions the reference 27 of slide 24 so that a Cartesian coordinate solution of $A\angle\alpha+B\angle\beta$ may be read directly on the scales 11a or 11b of base 10. Thus the $x$ and $y$ coordinates of reference 27 with respect to scales 11a and 11b give the numerical values $x'$ and $y'$ of the solution in Cartesian coordinates and the resultant R' may be written off as $R'=x'+jy'$. In Fig. 4 the polar solution is then easily determined by means of member 16.

In order to find the Polar coordinate solution in Figs. 4 to 7, it is necessary to free the arm 14 for further motion. In the case of Fig. 5, the arm 16 and slide member 29 are manipulated to bring the reference 32a thereof into alignment with the reference 27. (V) Then the arm 14 is rotated and its slide member 18 manipulated to bring its reference 23 into alignment with positioned reference 32a. The polar value of R is now read directly from scales 36 under cross line 38 of arm 14 and the angular value $\psi$ of the solution $R'\angle\psi$ is read on protractor scale 13 below center line 19. The arm 16 serves simply the function of a "keeper" i. e. to free the arm 14 for further manipulation while keeping the position of reference 27 determined by addition of vector $A\angle\alpha+B\angle\beta$.

In the cases of use of the devices of Figs. 6 and 7 which do not have any arms 16, the arms 40 and 41 of Fig. 6 or links 45, 47 and 48 function as "keepers" after the position of reference 27 determined by the addition of vectors $A\angle\alpha+B\angle\beta$ has been located. In the case of Fig. 6, arms 40 and 41 are manipulated to bring reference 43 into alignment with reference 27, and similarly in Fig. 7, links 45, 47 and 48 are manipulated to bring reference 51 into alignment with reference 27. This frees the arms 14 of each of these devices so that they can be adjusted respectively to bring references 23 into alignment either with the adjusted references 43 or 51. The values of R' and $\angle\psi$ can then be read directly, respectively on scales 36 under cross line 38 of arm 14 and protractor scale 13 under center line 19.

Subtraction of vectors $A\angle\alpha-B\angle\beta$ is similarly performed since in effect $$A\angle\alpha-B\angle\beta=A\angle\alpha+(-B)\angle\beta=R''\angle\theta$$

The operational steps for substraction are shown diagrammatically in Fig. 13. (I) The slide member 18 of these Figures 2–7 inclusive is pushed in slot 14a to the position reference 23 over the center P and arm 14 is rotated about center P until the angle $\angle\alpha$ is read on protractor scale 13 under center line 19. (II) Then arm 21 is rotated about P as a center until the angle $\beta+180°$ is read on protractor scale 13 under center line 28. (III). Maintaining this angular position of arm 21, the slide 24 is pulled out until the magnitude |B| is read on scales 25 under cross line 26. (IV) Then still maintaining the angular position of arms 14 and 21, the slide 18 is pulled out along slot 14a until the magnitude |A| appears on scales 36 under the cross line 38. This positions the reference 27 of slide 24 so that a Cartesian coordinate solution of $A\angle\alpha-B\angle\beta$ may be read directly on the scales 11a or 11b of base 10. Thus the $x$ and $y$ coordinates of reference 27 with respect to scales 11a or 11b give the numerical value $x''$ and $y''$ of the solution in Cartesian coordinates and the resultant R'' may be written off as $R''=x''\pm jy''$ as the case may be. In Fig. 4 the polar solution is then easily determined.

(V). In order to find the Polar coordinate solution in Figs. 4 to 7, it is necessary to free the arms 14 for further motion exactly as in the case of addition. This is done by manipulating the keeper arm 16 of Fig. 5 in the same way as for addition, and similarly the keepers 40, 41 of Fig. 6 and 45, 47, 48 of Fig. 7, whence the values of R'' and $\theta$ can be read directly, respectively on scales 36 under cross lines 38 of the arm 14 and on protractor or polar scale 13 under center line 19 after the arms have been adjusted in the same way as in the case of vector addition.

If additional vectors are to be added or subtracted, for example, if a third vector is to be added or subtracted from the addition or subtraction of $A\angle\alpha$ and $B\angle\beta$, the third vector is added or subtracted from the solutions $R'\angle\psi$ or $R''\angle\theta$ previously obtained in substantially the same manner as described for the other additions or subtractions.

The device of Fig. 1 may be operated, for example, to secure the vector sum of two vectors $A\angle\alpha$ and $B\angle\beta$ as shown in Figs. 8–11 in the following manner:

Arm member 16 is rotated about center P until its center line 32 indicates on polar scale 13 the angle $\alpha$. Then slide 29 is moved outwardly in slot 16a until its scales 30 read through cross line 31 indicates the value |A| of the vector $A\angle\alpha$. These operations position the reference 32a with respect to the base 10 at a point corresponding to that which the leading tip of the vector $A\angle\alpha$ would occupy (Fig. 8).

The center reference 23 of arm member 14 is then moved into axial alignment with the center of rotation P and arm member 14 is rotated about center P to overlie the adjusted position of the arm member 16. Then arm member 21 is rotated about the axially aligned centers (P and 23) until the center line 28 of its slide 24 indicates on the protractor scale 13 the angle $\angle\beta$. Then slide member 24 is pulled outwardly of slot 21a until the cross line 26 indicates on scale 25 the value |B| of the vector $B\angle\beta$. These operations position the reference mark 27 on slide 24 with respect to the base 10 at a point corresponding to that which the leading tip of the vector $B\angle\beta$ would occupy (Fig. 9).

Then with the three arm members 14, 16 and 21 maintained in their angularly adjusted positions as just described, the slide member 18 of arm member 14 is pulled outwardly in its slot 14a until the reference mark 23 overlies reference mark 32a. This positions the arm 21 as shown in Fig. 10. The reference mark 27 then lies at the position of the leading end of the resultant of sum of the two vectors $A\angle\alpha$ and $B\angle\beta$.

Then with arm members 14 and 21 maintained in their adjusted positions, arm member 16 is rotated about point P and slide member 29 pulled out in its slot 16a until the reference 32a underlies the position of reference 27 as shown in Fig. 10. The value of the resultant R' is then read directly on scales 30 of slide member 29 under cross line 31 and the angular disposition ψ of the resultant is read on protractor scale 13 under center line 32 of slide 29. In other words the distance P to 32a of Fig. 11 is the numerical value of the resultant at the resultant angle. In this way $A\angle\alpha+B\angle\beta=R'\angle\psi$ can be conveniently determined. If additional vectors are to be added for example $A\angle\alpha+B\angle\beta+C\angle\rho$, vectors A and B are added as before and their resultant $R'\angle\psi$ is added to $C\angle\rho$ in the same manner.

To determine the difference between two vectors, for example, $A\angle\alpha-B\angle\beta$ with the apparatus described in Fig. 1 would be an equally simple series of operations.

The arm member 16 is positioned as shown in Fig. 8 to bring the reference 32a to the position of $A\angle\alpha$. Then arm 14 is rotated into parallelism with arm 16 and slide 18 is positioned to bring reference 23 over center P and arm member 21 is rotated to bring it to the position $\beta+180°$ and slide 24 adjusted so that reference 27 is positioned at the value |B|. Then slide member 18 is adjusted to bring reference 23 into alignment with reference mark 32a. Then arm member 16 is rotated and the slide member 29 is manipulated to move reference 32a into alignment with reference 27. The scale 30 under cross line 31 then indicates the numerical value of the difference between the two vectors and the reading under center line 32 on the protractor scale 13 indicates the angular disposition of the resultant vector. The real and imaginary components of this vector may be read directly on scale 11.

It will be noted that on the devices of Figs. 5–7 the "keeper" arm keeps the sum $A\angle\alpha+B\angle\beta$, whereas in the device of Fig. 1 arm 14 "keeps" vector $A\angle\alpha$ only. That is the only difference.

The devices of Figs. 1–7, therefore, affords very convenient means for adding and subtracting coplanar vectors. In a sense they afford quasi-graphical addition and subtraction of vectors. They will also handle problems in plane trigonometry (including certain algebraic problems that may be reduced to trigonometric problems, such as the law of Pythagoras:

$$\lambda=\sqrt{a^2+b^2}$$

It should be noted that in the above descriptions the term "vector" was merely used as a general mathematical concept, not to confine the possible applications of the devices described to vector calculations alone.

The various center lines 19, 28, 32, scales 36, 25, 30, cross lines 38, 26 and 31, and reference marks 23, 27, 32a, 43 and 51 are positioned on such faces of the members on which they are applied so that parallax errors in reading of scales and references will be as small as possible. Likewise if the base 10 is opaque, the mirrored surface thereof will eliminate parallax when aligning two references and in reading various of the scales.

The reference marks 23 and 27 are, preferably, cross lines that intersect each other at angles of 70° while reference marks 32a, 43 and 51 are a $y$ with legs at 120° so as to make it easy to read the scales on the grid system and to superpose the reference marks with respect to each other when necessary.

It will be understood that the particular arrangement of the scales and reference marks can be varied on the various arm members and slides. For example, as shown in Fig. 1a, the scales 30' which are equivalent to the scales 30 on slide member 29 are provided instead on the arm 16'. The y reference 32a' is augmented by additional indicators, as shown, so that the reference 31 on arm 16 of Fig. 1 can be eliminated. This same system can be utilized for the other slide members with respect to the arms which carry them if desired. Other arrangements of the scales and indicators are possible and contemplated as within the scope of this invention.

The devices described have many other practical uses. While specific embodiments have been described, it should be understood that changes in structural detail are contemplated within the scope of the claims. There is no intention of limitation to the exact details shown and described.

What is claimed is:

1. A calculating device of the character described comprising a base member having a polar scale and rectangular grid systems thereon, transparent slotted members pivotally supported on said base member to rotate about the center of said polar scale, transparent slide members carried by the pivoted members and movable longitudinally in the slots thereof, an additional transparent slotted member pivotally carried by one of said slide members whose center rotation is movable into axial alignment with said first-named center and a longitudinally movable transparent slide member carried by said additional member in the slot thereof and scales and indicators in conjunction with various of said pivoted and slide members.

2. A calculating device of the character described comprising a base member having a polar scale and rectangular grid systems thereon, an arm member pivotally supported on said base member to rotate about the center of said polar scale, said arm member being fixed against longitudinal movement relative to said center, a slide member carried by the pivoted arm member and movable longitudinally thereof, a member pivotally carried by said slide member and whose center of rotation is movable into axial alignment with said first-named center, a longitudinally movable slide member carried by said second pivoted member, an additional pivoted member adapted to rotate about said first center, and a slide member movable longitudinally with respect to said additional pivoted member and having a reference, said two last-named members serving as a keeper for fixing a point determined by others of said pivoted and slide members.

3. A calculating device of the character described comprising a base member having polar and rectangular scales thereon, two transparent arm members both pivotally supported on said base member on the same face thereof, to rotate about the center of the polar scale, said arm members being fixed against longitudinal movement relative to said center, transparent slide members carried by the pivoted members and movable longitudinally thereof, scales and indicators in conjunction with all said transparent members, an additional member pivotally carried by one of said slide members whose center of rotation is movable into axial alignment with said first-named center, a longitudinally movable transparent slide member carried by said additional member and scales and indicators in conjunction with said additional member and said last-named slide member whereby said polar and rectangular scales may be observed through the various members.

4. A calculating device of the character described comprising a base member having polar scale and rectangular grid systems thereon, an arm member pivotally supported by said base member to rotate over its surface about the center of said polar scale, a slide member carried by said pivotally supported arm member, said slide member having a fixed reference thereon for cooperation with said rectangular grid system and a fixed reference thereon for cooperation with said polar scale and one of said members having a linear scale whereby said two members may be positioned readily to place said first-named fixed reference with respect to said center at a point corresponding to the numerical value of and angular direction of a vector, a second pivoted arm member supported by said base at said center, a slide member carried by said second arm member, said second slide member also having a fixed reference thereon for cooperation with said rectangular grid system and also having a fixed reference thereon for cooperation with said polar scale, and one of said two last-named members having a linear scale, a third pivoted arm member supported rotatably about the first fixed reference on said first slide member, its center of rotation being movable into axial alignment with said first-named center, a third slide member carried by said third arm member, said third slide member having a fixed reference for cooperation with said polar scale, and one of said two last-named members having a linear scale whereby said third member may be positioned in the angular direction of a second vector and then have its center of rotation transposed to overlie the position of the first fixed reference of said first slide member when the first fixed reference lies at the said point determined by the value and angular direction of said first-named vector, said first-named arm member then being movable to the angular position of the resultant of said two vectors, and its slide member then being movable to bring the first fixed reference thereof to overlie the point corresponding to the numerical value of said resultant at the angular disposition of the latter whereby the numerical value of said resultant may be read directly on the linear scale associated with said first members, and its angular value by the position of the second fixed reference of said first pivoted member with respect to said polar scale, and its real and imaginary components may be read on said rectangular grid system.

5. A calculating device of the character described comprising a base member having a polar scale and rectangular grid system thereon, an arm member pivotally supported by said base member to rotate over its surface about the center of said polar scale, a slide member carried by said pivotally supported arm member, said slide member having a fixed reference thereon for cooperation with said rectangular grid system, and having a second fixed reference thereon for cooperation with said polar scale and one of said members having a linear scale whereby said two members may be positioned readily to place said first-named fixed reference with respect to said center at a point corresponding to the numerical value of and angular direction of a vector, a second pivoted arm member supported by said base at said center, a slide member carried by said second arm member, said second slide member also having a fixed reference thereon for cooperation with said rectangular grid system and having a second fixed reference thereon for cooperation with said polar scale, and one of said two last-named members having a linear scale, a third pivoted arm member supported rotatably about the first reference on said first slide member, its center of rotation being movable into axial alignment with said first-named center, a third slide member carried by said third arm member, said third slide member having a fixed reference for cooperation with said polar scale, and one of said two last-named members having a linear scale whereby said third member may be positioned in the angular direction of a second vector and then have its center of rotation transposed to overlie the position of the first fixed reference of said first slide member when the first fixed reference lies at the said point determined by the value and angular direction of said first-named vector, said first-named arm member then being movable to the angular position of the resultant of said two vectors, and its slide member then being movable to bring the first fixed reference thereof to overlie the point corresponding to the numerical value of said resultant at the angular disposition of the latter whereby the numerical value of said resultant may be read directly on the linear scale associated with said first members, and its angular value by the position of the second fixed reference of said first pivoted member with respect to said polar scale, and its real and imaginary components may be read on said rectangular grid system, and frictional means for maintaining each member in any adjusted position.

LUDWIG REICHE.

REFERENCES CITED

The following references are of record in the file of this patent:

UNITED STATES PATENTS

| Number | Name | Date |
|---|---|---|
| 1,296,704 | Sayre | Mar. 11, 1919 |
| 1,560,747 | Weinbach | Nov. 10, 1925 |
| 1,853,740 | Mueller | Apr. 12, 1932 |
| 1,881,204 | Lundgren | Oct. 4, 1932 |
| 2,244,945 | Goodale | June 10, 1941 |

FOREIGN PATENTS

| Number | Country | Date |
|---|---|---|
| 744,709 | France | Apr. 26, 1933 |